July 6, 1954     A. W. JOHNSON     2,682,705
SPOON FOR CHILDREN
Filed June 16, 1952

*INVENTOR.*
ALFRED W. JOHNSON
BY
AGENT

Patented July 6, 1954

2,682,705

UNITED STATES PATENT OFFICE 2,682,705

SPOON FOR CHILDREN

Alfred W. Johnson, Duluth, Minn.

Application June 16, 1952, Serial No. 293,777

2 Claims. (Cl. 30—324)

This invention relates to spoons and has special reference to a spoon for use by infants and children who are learning to feed themselves.

It is well known that when children are learning to feed themselves a spoon is the first implement they are given to use. Because children have no great degree of dexterity they have difficulty picking up food with the spoon for they cannot hold the bowl of the spoon at the proper angle for picking up food. Also, a considerable amount of food is usually spilled on the floor, rugs, table, and/or high chair before a child developes any skill in handling the spoon. This food spilled is wasted, and also causes quite a great deal of extra work for the child's mother cleaning up the spilled food. In addition, this food is often spilled on the child's clothing making for extra washing and ironing.

It is therefore, one of my principal objects to provide a spoon for use by infants and children who are learning to feed themselves to make it easier for children to pick up food in their spoon and, which will materially reduce the amount of spillage of food by the child's handling of the spoon.

Another object is to provide a spoon which is convenient for a child to grip and handle.

A more specific object is to provide a spoon with a bowl portion which is pivotally connected to the handle portion in such a manner that the bowl portion is biased by gravity to remain in a level position irrespective of the normal axial rotation of the handle from the pivot point, thereby to facilitate the bowl portion being filled with the food, and also eliminating the possibility of spillage therefrom while a child is feeding himself.

Another object is to provide such a spoon which is simple, and inexpensive to manufacture and sell.

Another object is to provide such a spoon with a stop for the pivotal bowl portion whereby when a child puts the spoon into food and moves the spoon therethrough the bowl of the spoon will tip slightly, upon resistance by the food, until the stop prevents its tipping when it will move through the food in tipped position which will facilitate the picking up of food as it abuts the side walls of the dish. It is well known that children normally use a dish with high side-walls and that they push the spoon through the food towards and to the side-walls before lifting it out, the side-walls serving to aid in getting food into the spoon.

These and other objects and advantages of my invention will become more apparent as the description proceeds.

In the accompanying drawing forming a part of this application:

Figure 1:
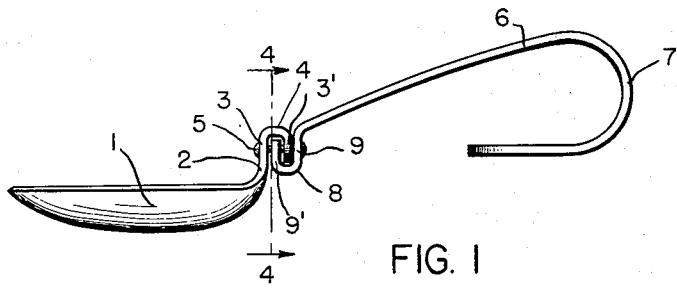
Fig. 1 is a side elevational view of a spoon embodying my invention.
Figure 2:
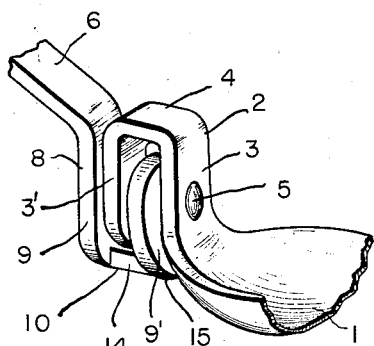
Fig. 2 is an enlarged fragmental perspective view of the hinge connection between the bowl and the handle of the spoon.

In the drawing, the reference numeral 1 indicates the bowl of a spoon which may be of any desired shape, of course. A narrow stem-like member 2 is provided integral with the bowl, as shown, the stem member being bent to a substantially inverted U-shape providing spaced substantially parallel legs 3 and 3' which extend in a direction substantially normal to the plane of the bowl of the spoon, the legs being connected by the transverse member 4. Each of the legs 3 and 3' has a perforation therethrough, now shown, the perforations being in axial alinement to receive the pivot pin 5. The pivot pin is disposed preferably in a plane substantially parallel to the plane of the bowl of the spoon but is spaced a substantial distance above the bowl of the spoon, the reason for which will become apparent.

The handle 6 of the spoon is of any suitable shape, however, it is preferably curved on its outer end as at 7 to provide a convenient grip or hand-hold for a child.

The inner end of the handle is narrow and has a U-shaped member 8 formed integrally therewith. The member 8 is disposed in the opposite direction to the U-shaped member 2 of the bowl and has a pair of spaced substantially parallel leg members 9 and 9' joined by a transverse member 10. The legs 9 and 9' are perforated to receive the pivot pin 5, as shown, with the leg 9' carried between the legs 3 and 3', and the leg 3' carried between the legs 9 and 9'. In other words, the U-shaped members are joined together with one of each of their legs intermediate the two legs of the other U-shaped member. The pivot pin connects the two members, 2 and 8, pivotally, as shown.

As may readily be seen, when one holds the handle of the spoon with the bowl in substantially level position the bowl is biased by gravity to remain level even though the handle may be turned or rotated somewhat on its pivotal connection to the spoon bowl. With food carried in the bowl, the gravitational tendency of the bowl is even greater because of the location of the pivot point and the added weight in the bowl. The pivotal mounting or connection between the bowl and handle makes it less likely that any food will be spilled by a child using the spoon, of course.

Figure 4:
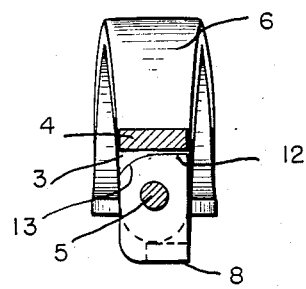
Fig. 4 is a sectional view on the line 4—4 Fig. 1 illustrating the stop arrangement which facilitates the picking up of food by an inexperienced child.

As clearly shown in Fig. 4, the leg 9! which is carried between the legs 3 and 3' has an edge portion 12 on its outer or free end which lies closely adjacent the transverse member 4 and abuts same when the handle is rotated slightly to one side of normal relation to the bowl. The portion 12 acts as a stop, in conjunction with the member 4, to prevent the rotation of the handle or bowl relative to each other in one direction. The opposite edge portion 13 of the leg 9' is rounded off as shown to permit rotation of the spoon handle relative to the spoon bowl. The direction of rotative or non-rotative movement of the handle and spoon bowl relative to each other may be varied in different spoons so as to provide for both right and left handed children.

The stop arrangement above described makes it easier for a child to fill the bowl of his spoon. The spoon bowl is, as stated normally on a level plane because of its pivoted mounting. When the spoon bowl is lowered into food the bowl remains level. The natural tendency for a child, in trying to fill the spoon with food, is to draw the spoon toward himself. In so doing, the spoon bowl drags in the food and is tipped slightly until the stop 12 engages its abutment 4. This places the spoon bowl on an inclination where it travels readily into the food and builds up a quantity thereof in front of itself as it travels. When the spoon bowl touches the side wall of the dish, not shown, the child lifts the spoon, of course. Immediately the spoon levels itself to normal position thereby eliminating waste of food, undue spillage, or loss of the food from the spoon because of improper handling of the spoon by the child.

A child handling the above described spoon will learn to feed himself much quicker and will be able to eat his meals more quickly so that he will not become tired of his efforts before he has had sufficient to eat.

Figure 3:
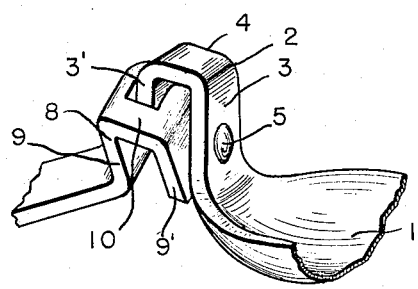
Fig. 3 is a view similar to Fig. 2 with the handle rotated to its most abnormal position while the bowl is still level.
Figure 5:
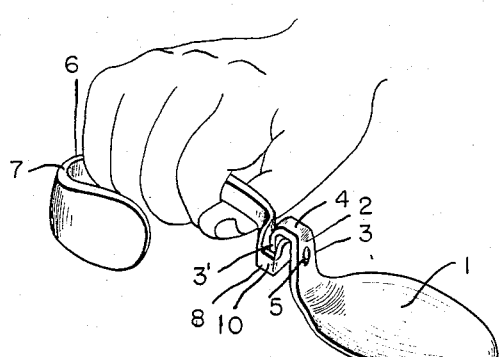
Fig. 5 is a perspective view showing the spoon in use.
Figure 6:
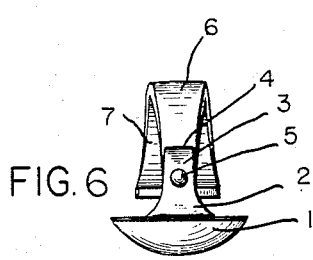
Fig. 6 is a front view of Fig. 1.

In Fig. 3 I have shown the spoon handle rotated to its extreme position away from normal relation with the bowl. This position would represent the spoon's being held above the child's head where with a conventional spoon, spillage would be inevitable. However, because a child normally grips the spoon handle as shown in Fig. 5, there is little likelihood of spillage even at the extremely rotated position, the axis of rotation of the spoon handle relative to the bowl being substantially parallel to the axis of the child's normal grip on the spoon. The member 10 has been cut away, as at 14 and the leg 9' has been rounded as at 15 to permit this extreme rotative movement.

Having thus described my invention; what I claim is:

1. As a new article of manufacture, a spoon for use by children comprising: a bowl, a stem extending from the rear edge of said bowl, said stem being formed to substantially an inverted U-shape and having spaced substantially parallel legs extending substantially normal to said bowl, a handle for said spoon, a U-shaped end on said handle, said end having spaced substantially parallel legs, said U-shaped end being disposed in an upright position, one leg of said end being carried between the two legs of said stem, and a pivot pin extending through said legs whereby a pivotal connection is provided between said handle and said bowl, said pivot pin extending in a substantially parallel plane to the disposition of said bowl whereby said bowl pivots on an axis substantially longitudinally of said spoon.

2. The structure as set forth in claim 1 and a stop on one of said U-shaped portions engageable with the other of said U-shaped portions to prevent the rotative movement of said bowl in one direction beyond substantially normal position relative to said handle whereby to facilitate a child's filling said bowl with food.

References Cited in the file of this patent
UNITED STATES PATENTS

| Number | Name | Date |
| --- | --- | --- |
| 659,341 | Dodd et al. | Oct. 9, 1900 |
| 1,974,092 | Alsaker | Sept. 18, 1934 |
| 2,505,122 | Krieger | Apr. 25, 1950 |